June 17, 1958     R. TRUBERT     2,839,264
FOOT-ACTUATED COCK
Filed May 27, 1955
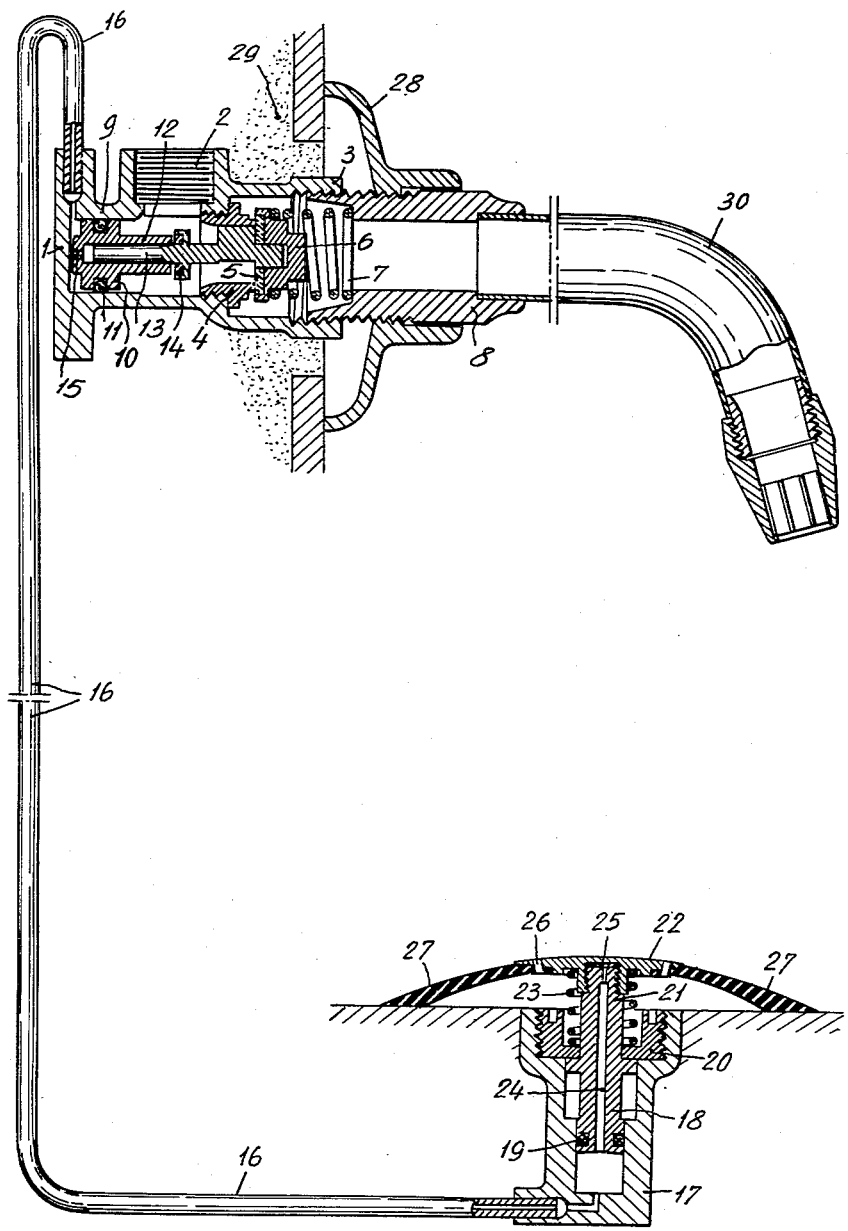
INVENTOR
RENÉ TRUBERT
By Linton and Linton
ATTORNEYS

United States Patent Office 2,839,264
Patented June 17, 1958

2,839,264

FOOT-ACTUATED COCK

René Trubert, Viroflay, France

Application May 27, 1955, Serial No. 511,717

Claims priority, application France June 3, 1954

3 Claims. (Cl. 251—57)

The object of this invention is to provide a foot-actuated cock intended more particularly for use as a tapping cock in pressure systems such as town water supply installations.

In many cases, notably in domestic or sanitary installations it is desirable to make available for the user a water-drawing control device adapted to leave the user's hands free. In this connection, foot-operated cocks have already been proposed but the hitherto known devices were not satisfactory in their practical embodiment because the water-supply pipes must pass under the floor surface where the control member is located. This is the main reason why devices of this general type have not been so widely used as might be inferred from the advantages offered by the foot-control. These advantages are particularly noticeable in the case of hot water cocks since the user can regulate and even stop the cock output even if his or her hands are not free, so that a substantial amount of hot water can be spared, a fact particularly interesting in installations having a restricted or limited hot-water supply.

The essential feature of the present invention lies in the fact that the cock, located as deemed more practical and economical for the specific use contemplated, comprises a plug operatively connected to a piston controlled in turn from a remotely positioned hydraulic-pressure means comprising a foot-actuated device embedded in the floor and connected to the cock through a thread-like hydraulic transmission pipe line.

According to another feature of the present invention the automatic filling of the hydraulic transmission for compensating possible liquid leaks or losses is effected by providing for this purpose a very narrow passage located between the cock inlet chamber and the hydraulic transmission. Said passage may consist simply of either a slight clearance around the plug-actuating piston, or an incomplete fluid-tightness of the piston packing. However, the same result may be obtained by piercing a very small hole through the piston or providing a narrow by-pass between the water-supply duct and the aforesaid very narrow passage.

When the aforesaid automatic filling is to take place through the cock piston the latter may actuate the cock plug through the intermediary of an auxiliarly valve adapted to close the aforesaid passage upon actuation of the foot-controlled device, the arrangement being such that this auxiliary valve cannot be re-opened until the system has resumed its inoperative condition.

The foot-controlled device may consist of a pressure-building piston rigid with a pedal normally urged by spring means to its upper or cock-closing position, this pedal-actuated piston being provided if desired with air-vent orifices closed by the mounting of the pedal at the upper portion thereof.

In order to afford a clearer understanding of this invention and of the manner in which the same may be carried out in the practice, a preferred form of embodiment thereof will be described hereafter with reference to the attached drawing forming part of this specification. The single figure of the drawing illustrates diagrammatically by way of example an axial sectional view of a cock and the control device associated therewith.

In the drawing, 1 is the cock body comprising an inlet 2 and an outlet 3. Between the inlet and outlet 2, 3 a fixed annular plug seat 4 is provided and a sealing disc 5 mounted on a plug proper or valve member 6 and is urged against the seat 4 by a coil spring 7 bearing with its other end against a shoulder formed for example on an annular outlet fitting 8, so that the spring will normally close the cock against the pressure of the supply water which is exerted on the other side of the seat 4.

Opposite the outlet 3 the cock body is formed with a flanged cylindrical extension 9 having slidably mounted therein a piston 10 engaging the bore of this extension through a peripheral packing 11. This packing 11 may be designed to provide an incomplete seal and permit a small leakage of water between the piston and the bore of the cylindrical extension 9 in order to assure a constant, automatic filling of the hydraulic transmission through which the cock is to be actuated. However, in the example illustrated this automatic filling is effected through another passage. To this end the piston 10 is provided with a tubular shank 12 projecting towards the plug 5 and having slidably mounted therein with a given clearance an axial rod 13 centered in the plug disc 5 and plug 6, as shown. This rod 13 is formed with an enlarged intermediate portion carrying another sealing disc 14 adapted to co-act with a seat consisting of the inner end of the shank 12 while, on the other hand, the piston 10 has an orifice 15 pierced therethrough which is of a size small enough to avoid interfering with the driving of the piston when the foot-control device is actuated for applying a pressure thereon. When this pressure is not exerted against the piston, the water pressure in the inlet 2 will move the seat of the shank 12 away from the sealing disc 14, thereby permitting the passage of water through the orifice 15 to complete the filling of the hydraulic transmission when the main sealing disc 5 is seated.

As already pointed out hereinabove, the narrow orifice 15 and the auxiliary sealing disc 14 may be dispensed with provided that their functions are performed by a leaking piston packing 11, the clearance therearound permitting the complementary filling ofthe hydraulic transmission without appreciably interfering with the proper operation thereof.

The bottom of the cylindrical extension 9 communicates through a thread-like pipe line 16 with the cylinder 17 of the control device. This cylinder is embedded in the floor and has slidably mounted therein a control piston 18 provided with a suitable piston packing 19, as shown. This piston is reciprocable in the cylinder 17 beneath an annular screw-plug 20 screwed in a correspondingly tapped enlarged upper portion of the cylinder 17, and the piston 18 has an upper extension 21 passing through the screw-plug 20, the top of this extension 21 having a screw-threaded portion adapted to receive a circular or like pedal head 22 constantly urged to its uppermost or inoperative position by a coil spring 23 located between the screw-plug 20 and the pedal head 22.

An air-vent hole 24 is pierced through the piston 18 and extension 21, and the top of this vent hole 24 is closed by the mounting of the pedal head 22, a suitable gasket 25 being positioned therebetween.

This pedal head 22 has a plurality of air-vent holes 26 formed therethrough and adapted to serve as a means for screwing the pedal head in or out. A substantially dome-shaped member 27 of flexible material is secured on the pedal head 22 and engages the floor surface with its adequately shaped peripheral outer edge. Preferably, this dome-shaped member 27 will project as little as possible above the floor level and when the pedal is depressed this member 27 is flattened somewhat to control the opening of the water cock, any air trapped beneath this dome-shaped member 27 escaping to the surrounding atmosphere through the holes 26 without offering any appreciable resistance to the foot action.

The device described hereinabove operates as follows:

In its inoperative condition, i. e. when the pedal 22 is not depressed, the plug disc 5 is seated by the spring 7 while on the other hand, the water pressure in the inlet 2 will urge the piston 10 to the left and the shank 12 thereof will be moved slightly away from the sealing disc 14, thereby enabling water under pressure to flow through the pipe line 16 to the cylinder 17 of the control device, the piston therein being thus moved to its uppermost position.

To ensure a proper operation of the control device any air trapped in the cylinder 17 must be discharged therefrom and to this end it will be sufficient to remove the pedal head 22 covering the air-venting hole 21 and to subsequently reset this pedal head 22 to obturate the air passage.

When the pedal 22 is depressed, the piston 18 is driven downwardly and water forced through the pipe line 16 into the cylinder 9. The piston 10 is thus moved toward the outlet 3 and as this movement begins the shank 12 engages the sealing disc 14 so that the liquid forced through the pipe line 16 cannot flow beyond the piston 10 and the latter will be moved to an extent corresponding to the pedal depression. As the same time the piston 10 will drive the plug 6 through the rod 13, thereby causing the sealing disc 5 to be unseated and permitting the water under pressure to flow out from the cock with an output proportional to the pressure exerted by the user's foot on the pedal 22. When the latter is subsequently released the spring 23 will move the pedal 22 to its uppermost position and the liquid in the hydraulic transmission is drawn in the cylinder 17 while the piston 10 is restored to its initial position, i. e. to the left, by the water pressure of the supply system. The parts are thus restored to their initial positions and the plug will be re-closed. The supply water may leak slowly around the packing 11 or across the orifice 15 to compensate any possible lossees of liquid in the hydraulic transmission.

It will be noted that this control device operates with remarkable accuracy and that it is possible to adjust the rate of flow with a view to obtaining exactly the desired output, even a very low output for example. The arrangement comprising two cylinders 9, 17 and two corresponding pistons 10, 18 respectively makes it possible to calculate the cross-sectional areas of these cylinders and pistons with a view to controlling the cock by exerting a predetermined effort on the control pedal, irrespective of the pressure existing in the water supply system. If for example the ratio of the inner diameter of cylinder 17 to the inner diameter of cylinder 9 is 1:2, the pedal stroke will be four times that of piston 10 and the effort exerted on the piston will be four times that exerted on the pedal. Therefore, the hydraulic transmission may act as a force-multiplying device and the stroke will be reduced accordingly.

In the drawing, 28 is a cap member screwed on the outlet fitting 8 and adapted to fit against the surface of a wall 29 if the cock is to be embedded in this wall as indicated in the drawing. The outlet fitting 8 may be provided with a nozzle or like member 30 having an anti-splash top nozzle or the like at its outlet end, as shown. A shower or sprinkling-rose may also be fitted on this outlet end, if desired. On the other hand, a swivelling or pivoted anti-splash nozzle may be mounted in a fitting having a vertical axis mounted on a cap member similar to the one illustrated but extending beyond the fitting 8 in the form of this vertical fitting.

Of course the single and preferred form of embodiment shown in the drawing and described hereinabove should not be construed as limiting the scope of the invention since many modifications may be brought thereto without departing from the principles of the invention as set forth in the appended claims. Thus, as already pointed out hereinabove, the seat 14 and orifice 15 may be dispensed with by mounting the sealing-disc carrier 6 directly on the rod of piston 10.

The cock according to the present invention can be used not only as a draw-off cock but also as a liquid valve, for example for initiating the discharge of a lavatory cistern by supplying water into the usual siphon.

What I claim is:

1. A pedal-operated cock, notably for tapping water or other fluids from pressure supply systems, or installations, comprising a cock body, a fluid inlet passage and a fluid outlet pasage in said cock body, a cock plug seat in said cock body which is positioned intermediate said inlet and outlet passages, a main plug in said outlet passage, resilient means normally urging said main plug against said seat so as to close said cock, a cylinder provided in said cock body which is aligned with and positioned on the side of the inlet passage opposite said fluid outlet passage, a piston in said cylinder, a chamber of relatively small dimensions on the side of said piston which is opposite to said outlet passage, a tubular shank formed integral with said piston, a rod connected to said main plug and received with certain diametral and axial clearance within said tubular shank, means for checking the fluid flowing through said axial clearance, a control cylinder remote from said cock, thread-like pipe line means for hydraulically connecting said chamber to said control cylinder, a piston reciprocable in said control cylinder, a control pedal connected to said piston and adapted to be depressed by the foot when it is desired to operate said cock, and spring means for normally urging said control pedal to its inoperative cock-closing position.

2. A pedal-operated cock according to claim 1, wherein said means for checking the fluid flowing through said axial clearance consists of an auxiliary plug formed on said rod for controlling the inlet of pressure fluid to said chamber.

3. A pedal-operated cock according to claim 1, wherein said pedal is provided with a dome-shaped member of resilient material for engagement with a supporting surface by its peripheral edge and being provided with holes therethrough acting both as means for unscrewing the pedal and as vent holes for placing the area beneath said dome-shaped member in communication with the atmosphere.

References Cited in the file of this patent
UNITED STATES PATENTS

| | | |
|---|---|---|
| 856,981 | McCarroll | June 11, 1907 |
| 874,106 | McCarroll | Dec. 17, 1907 |
| 2,308,478 | Lingold | Jan. 12, 1943 |